(12) United States Patent
Antonelli et al.

(10) Patent No.: US 8,047,149 B1
(45) Date of Patent: Nov. 1, 2011

(54) LASER-BASED METHOD FOR DOCKING AN UNMANNED UNDERWATER VEHICLE TO A SUBMARINE

(75) Inventors: Lynn T. Antonelli, Cranston, RI (US); Fletcher A. Blackmon, Forestdale, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 56 days.

(21) Appl. No.: 12/701,909

(22) Filed: Feb. 8, 2010

(51) Int. Cl.
*B63B 21/00* (2006.01)

(52) U.S. Cl. ............... 114/230.1; 114/312; 114/322

(58) Field of Classification Search ........... 114/230.1, 114/312, 322
See application file for complete search history.

(56) References Cited

U.S. PATENT DOCUMENTS

| | | | |
|---|---|---|---|
| 7,336,078 B1 * | 2/2008 | Merewether et al. | 324/326 |
| 7,671,783 B2 * | 3/2010 | Carcone | 342/9 |
| 2007/0046500 A1 * | 3/2007 | Herbert et al. | 340/932.2 |
| 2007/0222969 A1 * | 9/2007 | Millgard | 356/4.01 |
| 2008/0243426 A1 * | 10/2008 | Lundgren | 702/151 |
| 2008/0289558 A1 * | 11/2008 | Montgomery | 114/230.1 |
| 2009/0127387 A1 * | 5/2009 | Larkin | 244/1 TD |

* cited by examiner

*Primary Examiner* — Stephen Avila
(74) *Attorney, Agent, or Firm* — James M. Kasischke; Michael P. Stanley; Jean-Paul A. Nasser

(57) ABSTRACT

An Unmanned Undersea Vehicle (UUV) docking system is provided in which the UUV is responsive to a first rotating light beam (which emits from a submarine) to begin a docking procedure. The UUV utilizes a photodetector to detect the first light beam and to guide the UUV toward the submarine by utilizing the first light beam. In one embodiment, the UUV reflects light from the first light beam back to the submarine. A photodetector on the submarine detects the reflected light to ascertain that the UUV is locked onto the first light beam. The submarine then stops rotating the light beam so that a trajectory of the UUV heads in the direction of a docking station which is positioned on the submarine.

10 Claims, 5 Drawing Sheets

LASER-BASED METHOD FOR DOCKING AN UNMANNED UNDERWATER VEHICLE TO A SUBMARINE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION

1. Field of the Invention

The present invention relates generally to unmanned underwater vehicles (UUV) used with submarines and, more particularly, to a laser based system for autonomous docking of the UUV to a submarine.

2. Description of the Prior Art

Optical docking systems have been utilized on space vehicles, robot and machine guidance systems, and in various types of autonomous UUV docking situations.

However, docking to submarines involves relative motion of water currents which affects the motion of both the submarine and the UUV. This can result in a relative motion for which difficulties arise in either establishing or maintaining a visual lock between a docking station on the submarine and the UUV. For example, the UUV and/or the submarine may move to relative positions where the bulk of the submarine blocks the optical signals on the docking station of the submarine.

Acoustic methods for docking underwater vehicles have also been documented. The spatial accuracy of underwater acoustic docking systems, although useful for long-range docking procedures, may be severely limited for close range docking maneuvers with the submarine.

The following United States Patents describe various prior art systems that may be related to the above and/or other docking systems:

U.S. Pat. No. 3,646,771 (issued Mar. 7, 1972) to Greene, discloses an underwater communicating connection between a marine vessel, such as a submarine, and a stationary structure, such as a dock or underwater caisson or another marine vessel, for the passage of personnel, which is formed by juxtaposing the vessel and structure to isolate a water-containing space between watertight doors on the vessel and structure, removing water from the space, and admitting air at subaqueous pressure, whereby the vessel is forced against the structure by hydrostatic pressure; the doors are then opened. A flexible sealing member outside of the connection on the vessel or structure may engage a sealing surface on the other for additional sealing. The dock may include a tower extending to the water surface. The vessel can be positioned by anchors resting on a platform or engaged to a frame fixed to the ground.

U.S. Pat. No. 4,799,825 (issued Jan. 24, 1989) to Meyerhoff et al, discloses a method for underwater fuel transfer of liquid fuels such as crude oil from an off-shore, stationary underwater mooring to a submerged submarine oil tanker. There is provided a berthing guidance and control system including permanently moored acoustic transponders interrogated by the tanker sonar equipment to provide input commands for azimuth control along the on-tack position in conjunction with speed controls. The system also includes an arrestor mooring apparatus for decelerating the tanker as the tanker approaches the underwater station. This underwater station has the dual function use of providing mooring for the tanker and also reception of the tanker oil transfer device.

U.S. Pat. No. 5,748,102 (issued May 5, 1998) to Barron, discloses an apparatus for interconnecting an unmanned underwater vehicle and a free-fitting communications pod that includes a communications cable depending from the pod and extending to a buoy of less buoyancy than the pod, such that the cable carries communication signals between the pod and the buoy and extends generally vertically in a column of water between the pod and the buoy, the buoy being in communication with a distal station. The apparatus further includes a mobile unmanned underwater vehicle having therein guidance means for directing the vehicle to the cable, the vehicle being in communication with a control vessel, connector means mounted in a nose portion of the vehicle and adapted to intercept the cable, the connector means being further adapted to permit the cable to slide therethrough as the vehicle continues movement after the intercept of the cable, and complementary alignment means on the vehicle and the pod adapted to cause the vehicle to engage the pod in a preselected orientation and azimuth, with the communication components of the UUV and pod in alignment, whereby to place the control vessel in communication with the distal station.

U.S. Pat. No. 6,502,527 (issued Jan. 7, 2003) to Danielson, discloses a system for recovering submerged devices that uses two recovery tubes of an underwater recovery vehicle. A recovery member is disposed within a first recovery tube. A second recovery tube receives the submerged device. To recover the submerged device, the recovery member is extended from the first recovery tube. A capture arm, which is pivotally attached to the end of the recovery member, is extended. The extended capture arm is engaged with the submerged device. The capture arm is adjusted to align the submerged device with the second recovery tube. The recovery member is retracted to recover the submerged device into the second recovery tube. Because the recovery member is not disposed within the same recovery tube that is used to house the retrieved submerged device, the submerged device may have an outer diameter approximately equal to the inner diameter of the recovery tube.

U.S. Pat. No. 6,677,889 (issued Jan. 13, 2004) to Van Rees et al, discloses an auto-docking system that can automatically dock a surface ship. The auto-docking system provides a close in radar system and a secondary propulsion system that is under control of a docking processor.

U.S. Pat. No. 7,025,014 (issued Apr. 11, 2006) to Forgach et al, discloses one or more docking cages releasably attached to a tow line extending from the stern of a retrieval surface ship, that emit optical tracking beacon beams picked up by sensors in unmanned underwater sea craft vehicles being approached, for steered propulsion thereof into rammed hook attachment to the cages. A sea craft vehicle thereby releasably attached to a cage, is towed onboard the retrieval ship by storage reel-in of the tow line, which is then disconnected from the cage and the retrieved vehicle for subsequent use in retrieval of other unmanned sea craft vehicles.

U.S. Pat. No. 7,505,366 (issued Mar. 17, 2009) to Blackmon et al, discloses a linear mechanism for optical-to-acoustic energy conversion for optoacoustic communication from an in-air platform to an undersea vehicle. Signals used in underwater acoustic telemetry applications are capable of being generated through the linear optoacoustic regime conversion process. A number of issues concerning linear optoacoustic communication is addressed that lead to a formulation of a linear regime optoacoustic communication scheme. The use of oblique laser bean incidence at an air-water interface to obtain considerable in-air range from the laser source to the vehicle is also addressed. The effect of oblique incidence on in-water range is addressed as well. Optimum and sub-optimum linear optoacoustic sound-generation techniques for selecting the optical wavelength and signal frequency for optimizing in-water range are identified. Optoacoustic techniques employing M-ary frequency shift keying and multi-frequency shift keying are compared with communication parameters such as bandwidth, data rate, range coverage and number of lasers employed.

United States Patent Publication No. 2006/0083111 (published Apr. 20, 2006) to Grasso, discloses a method for detecting, tracking and locating submarines that utilizes pulsed coherent radiation from a laser that is projected down through a water column, with particles in the water producing speckle from backscatter of the random particle distribution, with correlation of two closely time-spaced particle-based speckle patterns providing an intensity measurement indicative of the presence of a submarine. Subsurface submarine movement provides a subsurface wake which causes movement of particles such that two closely-spaced "snapshots" of the returns from particles in the same water column can detect particle movement due to the wake. The magnitude of the speckle pattern change indicates particle movement. In one embodiment, the return signals are imaged onto an intensified CCD or APA array that capture two successive laser pulses through the utilization of dual pixel registered cameras. Note that in the subject system, phase information is converted to measurable intensity information relating to particle motion.

United States Patent Publication No. 2008/0289558 (published Nov. 27, 2008) to Montgomery, discloses a profile scanner for locating a target zone on a profile of a vessel comprising an emitter adapted to progressively or instantaneously radiate towards the vessel; a receiver providing a signal indicative of radiation incident thereon; a controller or processor including stored instructions, for energizing the emitter and receiving the signal, and adapted to determine the vertical location of the target zone relative to scanner. All laser beams propagate in-air and are meant to assist surface vessels to dock to a stationary mooring on a pier to accommodate the tidal sea variation.

United States Patent Publication No. 2008/0302292 (published Dec. 11, 2008) to Ruggaber, discloses a method and apparatus for optical and autonomous docking of an underwater vehicle into a torpedo tube of a submarine. The apparatus has a moveable tube provided with an insertion/extraction device at one of its ends. The device is in the form of a tube or of a ring in a retracted state and in the form of a funnel in an extended state.

The above-cited prior art does not adequately disclose an optical docking system which is suitable for long range and short range docking of UUVs with a submarine. Consequently, those skilled in the art will appreciate the present invention that addresses the above and other problems.

SUMMARY OF THE INVENTION

It is therefore a general purpose and primary object of the present invention to provide an improved system and method of use for docking a UUV to a submarine.

It is a further object of the present invention to provide guidance and signaling between a submarine and an UUV utilizing light beams.

In order to attain the objects described, the present invention provides various methods for docking a UUV to a submarine. In one embodiment, the method comprises rotating a first light beam, which is positioned on the submarine and detecting the first light beam at the UUV, whereupon the UUV heads towards the submarine utilizing the first light beam for guidance.

Other steps comprise detecting light which is reflected from the UUV back toward the submarine. After detecting the reflected light at the submarine (which indicates the UUV is approaching the submarine) then the method may comprise changing rotation speed of the light beam from the submarine in order to move the first light beam. This movement guides the light-following UUV towards a docking station on the submarine.

In one embodiment, the method further comprises turning off the first light beam and then utilizing a second light beam positioned in a cylinder in the submarine. The second light beam is capable of guiding the UUV into the cylinder.

In another embodiment, the method further comprises utilizing UUV light beams to guide the UUV to a docking station positioned on a hull of the submarine such as by detecting the reflected light from the UUV light beams—which reflect from the docking station.

The method further comprises turning on a UUV light beam to signal the submarine to turn off the first light beam. The method comprises utilizing a blue-green light beam and filtering signals from a photodetector to reduce light noise— due to sunlight. Other steps comprise utilizing a quadrant photodetector to guide the UUV toward the submarine.

The present invention also provides a system for docking a UUV to a docking station on a submarine. The system comprises one or more elements such as a first submarine light transmitter positioned on the submarine, which is operable to produce a first light beam. A light detector may be utilized on the UUV for detecting the first light beam and for guiding the UUV towards the submarine after detecting the first light beam.

A light detector on the submarine may be utilized which is operable for detecting light reflecting from the UUV. After receiving the light reflecting from the UUV, the first light transmitter may rotate for guiding the light-seeking UUV toward the docking station.

The docking station comprises a cylinder in the submarine. A second submarine light transmitter is positioned in or proximate to the cylinder whereby the light detector on the UUV is operable for utilizing the second light beam to guide the UUV into the cylinder.

In another embodiment, the UUV further comprises a plurality of docking light transmitters and a plurality of docking light detectors. The system further comprises a UUV light beam positioned on a forward portion of the UUV, which provides a signal to the submarine to turn off the first light beam.

Other elements comprise reflective material on a forward portion of the UUV which reflects light around the UUV light detector back to the submarine light detector and in one embodiment, the submarine light transmitter is operable to produce a blue-green light beam. The UUV light detector may further comprise a quadrant photodetector, which is sensitive to the blue-green light beam.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
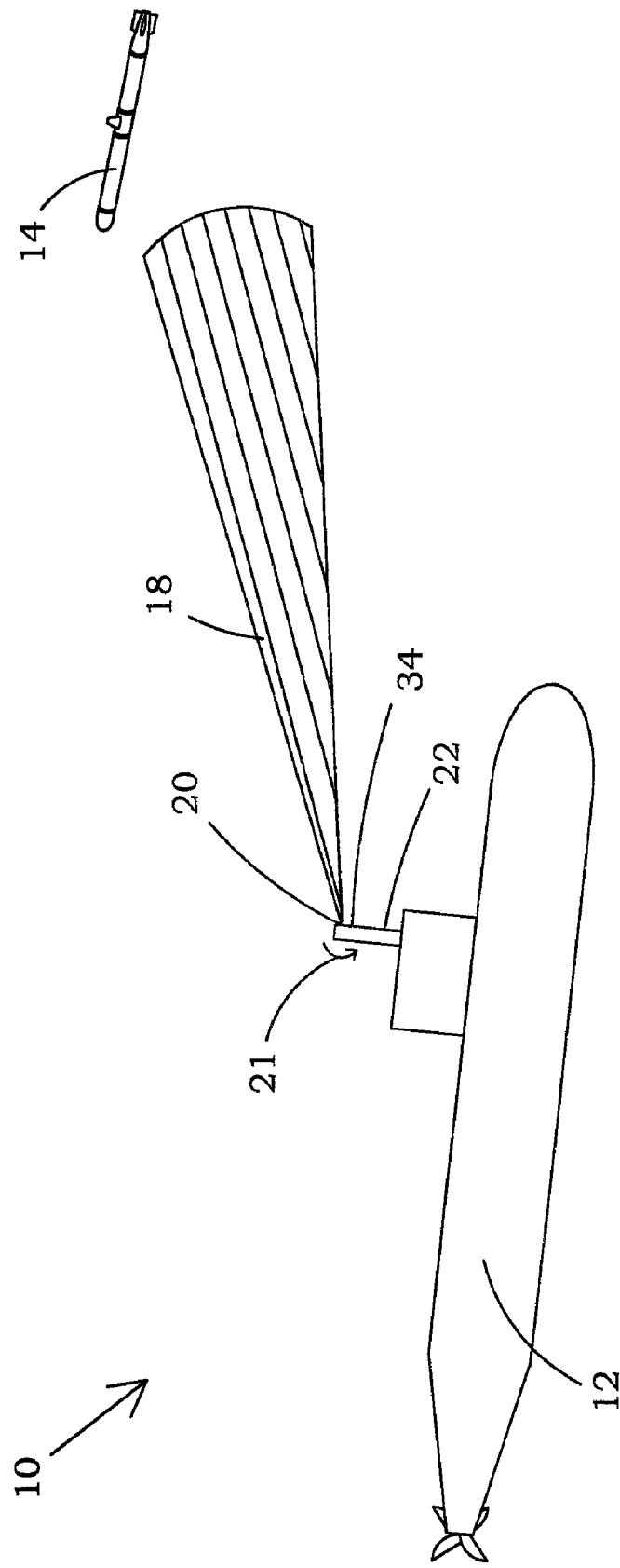
FIG. 1 depicts an optical beacon utilized to initiate a docking sequence in accordance with one embodiment of the present invention.

Referring now to the drawings and, more specifically, to FIG. 1, there is shown a docking system 10 in the initial stages of a docking operation between a submarine 12 and an unmanned underwater vehicles (UUV) 14 in accordance with one embodiment of the present invention.

The submarine 12 has a light transmitter 20 positioned so that the transmitter produces a light beam 18, which is recognized by the UUV 14 to start the docking process. The UUV 14 may utilize photodetectors, such as a specially modified quadrant photodetector 16 (shown in FIG. 2) to detect the light beam 18.

Prior to docking, it is desirable to calibrate the photodetectors of the UUV 14 to filter extraneous light noise—such as sunlight. This filtering is especially useful for shallow water docking operations.

In one embodiment, the quadrant photodetector 16 is modified so that optical beams in the blue-green wavelength are utilized because this wavelength experiences the least underwater energy attenuation in water; thereby, allowing for longer laser-light propagation distances and longer initial docking ranges. An optical filter may be utilized to filter out extraneous light. Other features of the photodetector 16 are discussed hereinafter.

To initiate the laser-based docking routine, the submarine 12 transmits the conical blue-green wavelength light beam 18. In one embodiment, the laser or light transmitter 20 may be located on a submarine mast 22 in order to allow full rotation scanning of the submarine 12. Other known means for rotating, scanning, pulsing, and the like may be utilized to produce a light beam that is detectable by the UUV 14.

In one embodiment, the light beam 18 is rotated as indicated by arrow 21 to scan the light beam in a plane with respect to the submarine 22. The rotation of the light beam 18 allows the UUV 14 to detect the light beam in various orientations between the submarine 12 and the UUV. One of the orientations is depicted in FIG. 1.

The detection range is primarily determined by the optical attenuation in the water, the photodetector sensitivity for one-way optical transmission, and the brightness of the light beam 18. In most instances, the light transmitter 20 transmits the light beam 18 brightly enough to be detected by the UUV 14 at a significant distance in relatively clear ocean water. The cone angle of the light beam 18 is also a factor in the distance that the light beam can be detected by the UUV 14. The cone angle of the light beam 18 may be selected based on additional factors besides the distance of detection such as the type of docking to the submarine 12 and the depths of operation of the submarine and the UUV 14.

Figure 3:
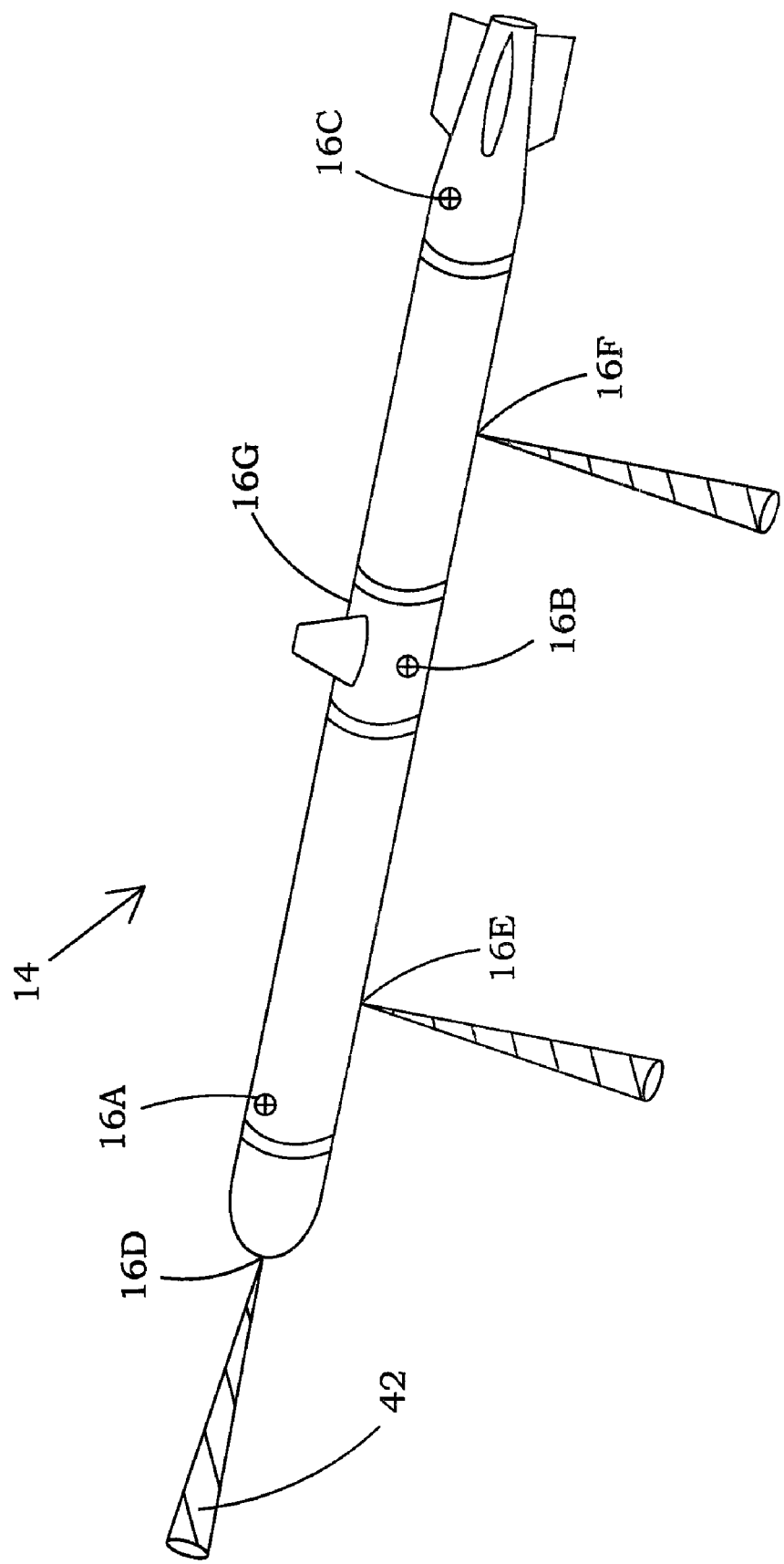
FIG. 3 depicts a UUV with light transmitters in accordance with one embodiment of the present invention.

Referring to FIG. 3, in one embodiment, the UUV 14 may have six or seven quadrant photodetectors, such as photodetectors 16A, 16B, 16C, 16D, 16E, 16F, and 16G on the outer hull of the UUV. While prior art quadrant photodetectors respond to infrared wavelengths, the quadrant photodetectors used to detect the light beam 18 will preferably operate in the 400 to 550 nm wavelength range in order to be useful for blue-green light detection.

The positions of the photodetectors on the port and starboard sides, as well as the aft and top surfaces of the UUV 14 are provided for detecting the light beam 18 at any orientation between the submarine 12 and the UUV. However, the number of photodetectors and the positioning of the photodetectors also depends on the type of docking with the submarine 12. For example, the UUV 14 may be designed to dock onto the hull of the submarine or into a conical tube, whereupon photodetectors may be provided on the UUV and/or the submarine 12 for final docking phase guidance.

Figure 2:
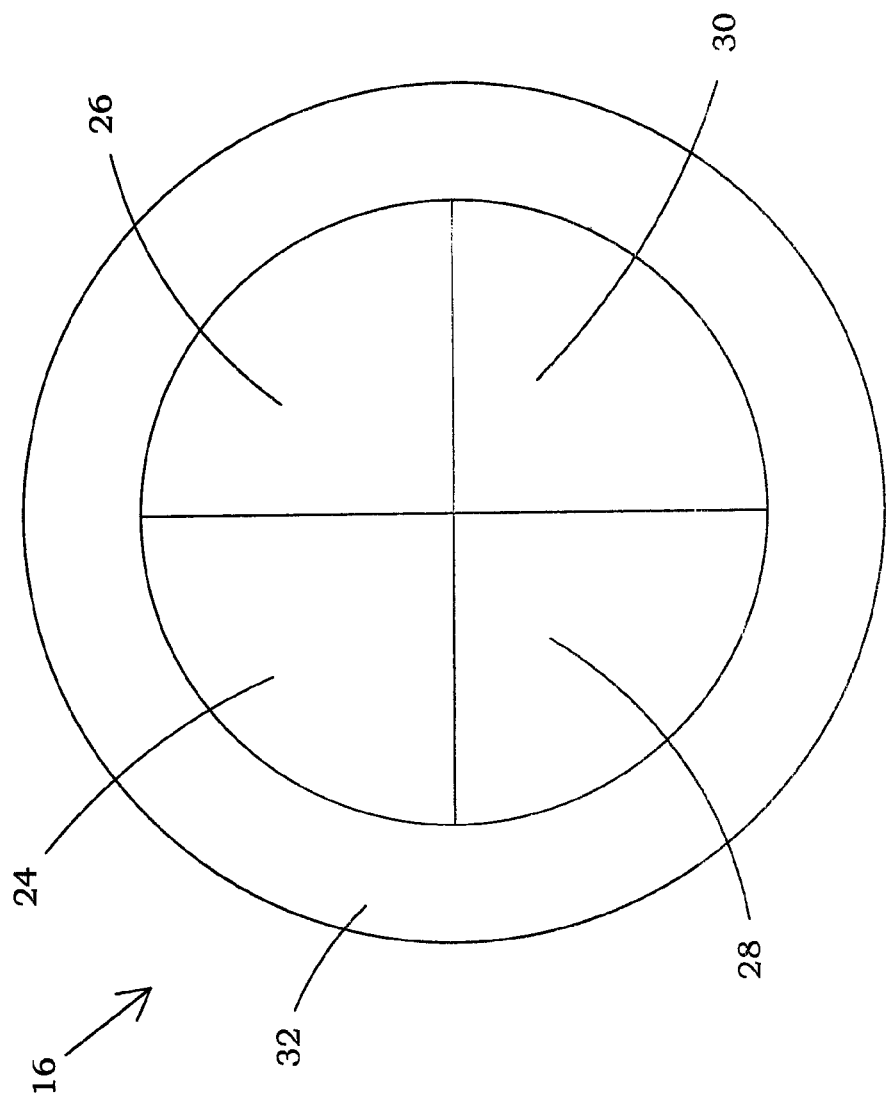
FIG. 2 depicts a quadrant photodetector adapted for underwater use with surrounding retroreflective material in accordance with one embodiment of the present invention.

Referring now to FIG. 2, the quadrant photodetector 16 comprises four photodetectors 24, 26, 28 and 30, each of which can detect the amplitude or energy of the light for the desired light frequency range. The quadrant design allows for determining the direction from which the light beam 18 originates. In other words, the electronics compare the amplitude or strength of the light beam signal at each of the photodetectors 24, 26, 28 and 30, in order to determine the direction from which the light beam 18 originates. The steering of the UUV 14 can then direct the front of the UUV toward the light transmitter 20.

Once the UUV 14 has established an optical lock on the front quadrant photodetector 16D, the UUV may proceed to the guideline tracking phase of the docking procedure wherein the UUV is guided toward the light transmitter 20 of the submarine 12.

The quadrant photodetector 16D, which is located in the front of the UUV 14, is used to acquire the light beam 18 and to lock onto the light beam in order to steer the UUV toward the submarine 12. The quadrant photodetector 16 is preferably surrounded by a ring 32 of retro-reflective material as shown in FIG. 2. The retro-reflective material of the ring 32 reflects the light beam 18 back toward the submarine 12.

In one embodiment, the submarine 12 utilizes a photodetector 34, which is positioned near the light transmitter 20, to capture reflected light from the retro-reflective material of the ring 32 on the UUV 14. In this way, the submarine 12 can detect that the UUV 14 has acquired the light beam 18 and is heading towards the light transmitter 20. The submarine 12 will be able to detect the reflected light from the light beam 18 if attenuation for two-way optical transmission is above the threshold detection level for the photodetector 34. Thus, the UUV 14 may be at a farther distance from the submarine 12 than when the UUV initially detects the light beam 18. As the UUV 14 steers towards the submarine 12, eventually the submarine will be able to detect the light beam reflections from the UUV.

Once the submarine 12 has detected the reflection of the light beam 18 off the UUV 14, then the submarine ceases rotating the light transmitter 20 and locks the light beam in the direction of the reflection—which should coincide with the direction to the UUV. In one embodiment, the light transmitter 20 is operable to gradually narrow the cone of the light beam 18 to add precision to the guidance information of the front quadrant photodetector 16D, which is utilized to maintain a heading towards the light transmitter.

In one embodiment, the submarine 12 detects the UUV 14 and then rotates the light beam 18 around the mast 22—as indicated by the arrow 21. However, the light beam 18 may be rotationally adjusted such that the UUV 14 is steered on a vector path leading the UUV toward a submarine docking area—one embodiment of which is indicated by docking elements 36 in FIG. 4. The speed of the UUV 14 and the rotational adjustment of light beam 18 are selected to be slow enough to minimize the chance that the UUV will lose a lock on the light beam. While FIG. 4 depicts the docking area to be on the upper bow surface of the hull of the submarine 12, it would be recognizable to one skilled in the art that the docking area may be aft or otherwise located.

If the UUV 14 is to dock in a tube station on the submarine 12, then the light beam 18 would initially acquire the UUV—as discussed previously. However, once the photodetector 34 on the submarine 12 detects the reflected light from the UUV 14, a second submarine light beam 38, emanating from the docking tube will be directed along the vector projection of the light beam 18 to acquire the UUV. This operation may occur after the light beam 18 has been rotated to orient the UUV 14 to acquire the second submarine light beam 38.

The light beam 18 can then be extinguished and re-locked with the UUV 14. The second light beam 38 can also be pulsed such that the time-gating on the reflection from the UUV 14 can be used by the submarine 12 to check the docking range during approach. Thus, the docking station may also be fitted with a photodetector to detect optical reflections from the UUV 14.

Figure 4:
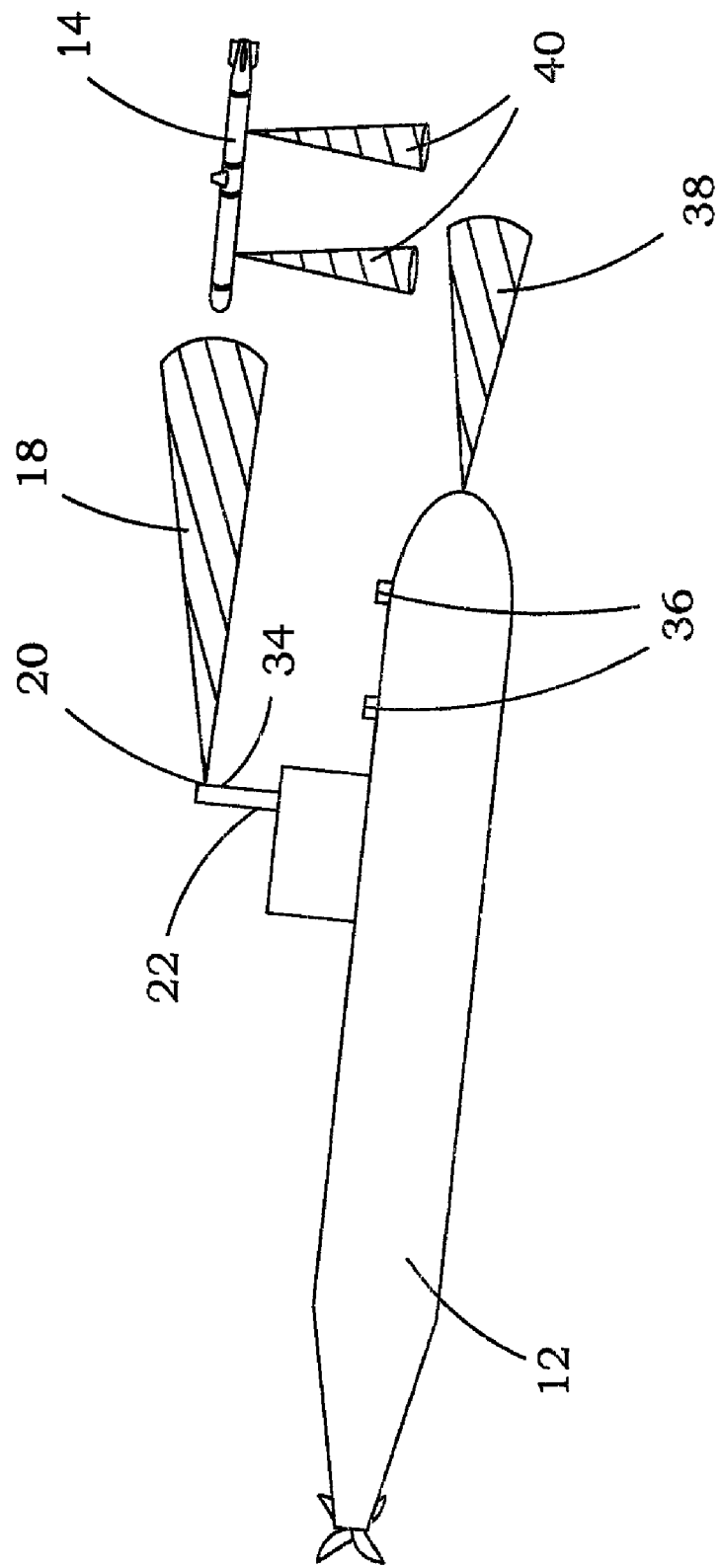
FIG. 4 depicts a UUV being led from a distance to a closer distance with the submarine in accordance with one embodiment of the present invention.
Figure 5:
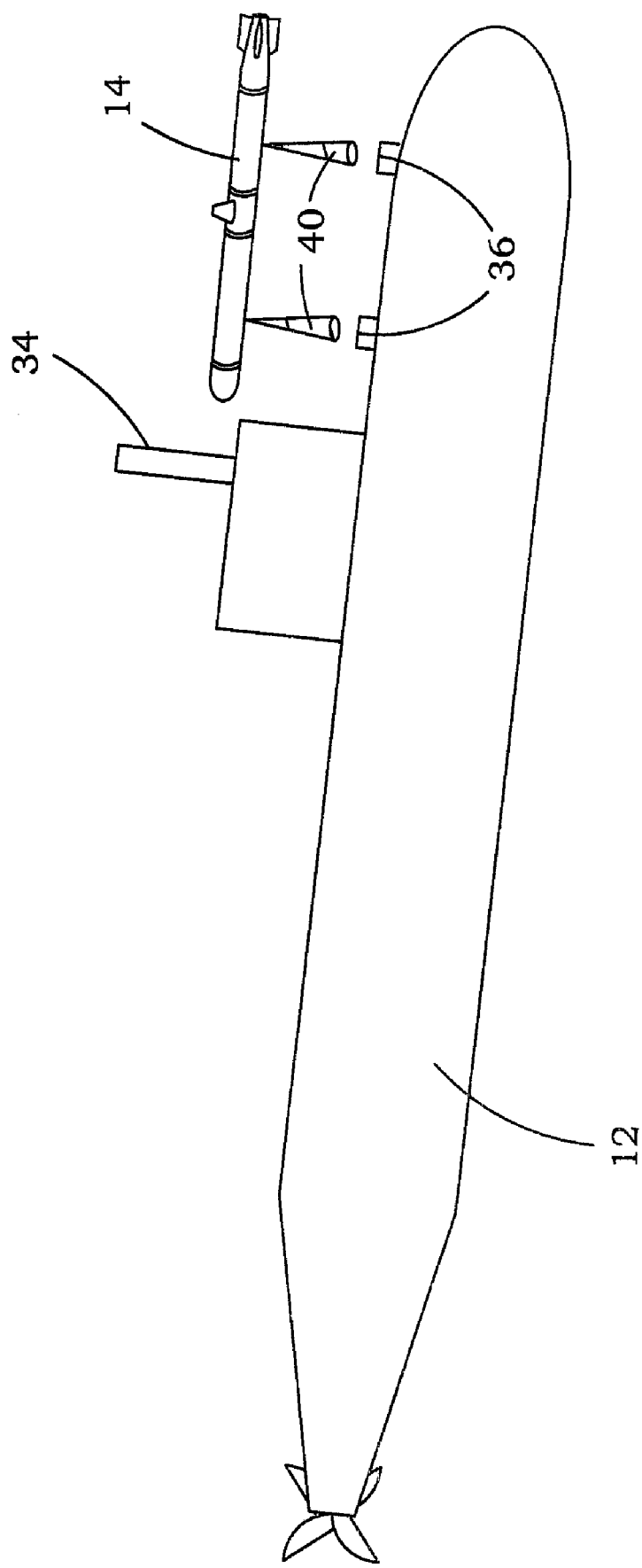
FIG. 5 depicts a close range docking operation between a UUV and a submarine in accordance with the present invention.

If the UUV 14 is to dock onto the hull of the submarine 12, as indicated in FIG. 4 and FIG. 5; then once the UUV detects the light beam 18, two bottom-mounted pulsed light sources 40 are activated. These light sources are used to detect the docking structure. The docking structure may comprise the docking elements 36, which may comprise pylons or the like on the hull of the submarine 12, or docking into a tube. The pulsing of light sources 40 (which may comprise LEDs) allows the UUV 14 to determine the range to the docking station of the submarine 12, and may also be utilized for collision avoidance.

Alternatively, the docking elements 36 on the hull of the submarine 12 may each comprise a ring or a region of retro-reflective material. The light sources 40 may be pulsed light beams in which the action of pulsing could be utilized to calibrate the approach onto the docking elements 36 and to acquire range information solely by means of optical and/or a complimentary high frequency acoustic pulse time delay.

Once reflections from the light sources 40 onto the retro-reflective material of the docking elements 36 are detected by the UUV 14, the UUV reduces forward thrust in order to position onto the docking elements. The docking elements 36 are then clamp the UUV 14 to the docking station. The optical reflections from the retro-reflective material surrounding or on the docking elements 36 are detectable by the bottom-mounted quadrant photodetectors 16E and 16F on the UUV 14.

Additionally and apart from the docking elements 36, the hull of the submarine 12 should have a low optical reflection. This low optical reflection reduces noise on the photodetectors of the UUV during the terminal docking phase.

The reflections, detected by the position-sensitive quadrant photodetectors 16E and 16F, are used to guide the UUV 14 onto the docking elements 36. If the submarine 12 loses a lock on the reflection from the UUV 14, then rotation of the light transmitter 20 is resumed until re-lock is achieved.

As the UUV 14 descends toward the hull of the submarine 12—as indicated in FIG. 5, the photodetector 34 will lose the lock on the reflection from the light beam 18. This loss of the lock could start the light transmitter 20 to rotate again. To advert this issue, the UUV 14 may also be fitted with a front light beam 42 in order to communicate that the UUV has entered the terminal docking phase.

Alternatively, light from the light transmitter 20 may be re-directed toward the center point between the docking members 36 to act as a tertiary docking guide. The UUV 14 could then acquire the beam from the re-directed light from the light transmitter 20 on the upper quadrant photodetectors 16A and 16B.

The docking is concluded when the UUV 14 has been secured to the docking station.

In summary, the method of operation has four stages: photodetector calibration/filtering to prevent sunlight or other stray light from affecting the docking operation; initiating the docking procedure by rotating the light beam for detection by the UUV and initial guidance; confirmation of detection of the UUV and guidance of the UUV toward the docking station; and terminal docking maneuvers of the UUV to the submarine.

It will be understood that the invention will incorporate computers and electronics for controlling light transmission and analyzing the photodetector outputs in order to provide feedback to the submarine and the UUV for docking control and UUV maneuver controls.

While the present invention may best utilize blue-green wavelengths for improved range capabilities, the invention is not limited to the blue-green radiation.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A method for docking an unmanned undersea vehicle (UUV) to a submarine, said method comprising the steps of:
    rotating a first light beam in which the first light beam is emittable from the submarine;
    detecting the first light beam at the UUV;
    guiding the UUV toward the submarine by utilizing the first light beam;
    detecting reflected light from the first light beam;
    changing rotation speed of the first light beam subsequent to said detecting step; and
    moving the first light beam to guide the UUV toward a docking station on the submarine.

2. The method of claim 1, said method further comprising the steps of extinguishing the first light beam;
    utilizing a second light beam emittable from a docking* station in the submarine; and
    guiding the UUV into the docking station.

3. The method of claim 1, said method further comprising the step of utilizing light beams from the UUV to guide the UUV to a docking station of the submarine.

4. The method of claim 3, said method further comprising the step of detecting reflected light of the light beams reflecting from the docking station as a confirmation of the docking of the UUV.

5. The method of claim 1, said method further comprising the steps of:
    utilizing a blue-green light beam as the first light beam; and
    filtering signals from a photodetector to reduce light noise.

6. The method of claim 1, said method further comprising the step of utilizing a quadrant photodetector to guide the UUV toward the submarine.

7. A system for docking an unmanned undersea vehicle (UUV) to a docking station, said system comprising:
- a first light transmitter operable to produce a first light beam;
- a light detector positioned on the UUV with the light detector operable, for detecting the first light beam and for guiding the UUV towards the docking station after detecting the first light beam; and
- a second light transmitter operable to produce a second light beam with said second light transmitter positioned at the docking station whereby said light detector is operable for utilizing the second light beam to guide the UUV into said cylinder;
- wherein said first light transmitter is moveable so as to guide the UUV toward the docking station;
- wherein the docking station comprises a cylinder in a submarine.

8. A system for docking an unmanned undersea vehicle (UUV) to a docking station, said system comprising:
- a first light transmitter operable to produce a first light beam;
- a light detector positioned on the UUV with the light detector operable for detecting the first light beam and for guiding the UUV towards the docking station after detecting the first light beam;
- a plurality of docking light transmitters positioned on the UUV; and
- a plurality of docking light detectors positioned on the UUV, said docking station comprising reflective material which reflects light produced by said docking light transmitters which is received by said plurality of docking light detectors to thereby guide the UUV to said docking station;
- wherein said first light transmitter is moveable so as to guide the UUV toward the docking station.

9. The system of claim 7, wherein said first light transmitter is operable to produce a blue-green light beam.

10. The system of claim 9, wherein said light detector further comprises a quadrant photodetector which is sensitive to the blue-green light beam.

\* \* \* \* \*